United States Patent
Khlif et al.

(10) Patent No.: US 6,756,287 B2
(45) Date of Patent: Jun. 29, 2004

(54) LASER-ASSISTED SLICING OF NOTCHED WAFER

(75) Inventors: Mohamed Salah H. Khlif, Fridley, MN (US); Gordon M. Jones, Eagan, MN (US); Paul E. Gallup, New Hope, MN (US); Jumna P. Ramdular, deceased, late of Brooklyn Park, MN (US), by Ruperta T. Ramdular, legal representative

(73) Assignee: Seagate Technology LLC, Scotts Valley, CA (US)

( * ) Notice: Subject to any disclaimer, the term of this patent is extended or adjusted under 35 U.S.C. 154(b) by 90 days.

(21) Appl. No.: 10/094,236

(22) Filed: Mar. 7, 2002

(65) Prior Publication Data

US 2003/0013227 A1 Jan. 16, 2003

Related U.S. Application Data

(60) Provisional application No. 60/305,742, filed on Jul. 16, 2001.

(51) Int. Cl.$^7$ ............................................... H01L 21/46
(52) U.S. Cl. ........................... 438/460; 438/33; 438/68; 438/462; 438/463
(58) Field of Search ........................... 438/33, 68, 430, 438/460–465

(56) References Cited

U.S. PATENT DOCUMENTS

| | | | |
|---|---|---|---|
| 4,761,699 A | 8/1988 | Ainslie et al. | 360/103 |
| 5,010,431 A | 4/1991 | Shinohara et al. | 360/103 |
| 5,210,666 A | 5/1993 | Chapin et al. | 360/103 |
| 5,479,310 A | 12/1995 | Atsushi et al. | 360/126 |
| 5,625,512 A | 4/1997 | Smith | 360/103 |
| 5,721,650 A | 2/1998 | Crane et al. | 360/103 |
| 5,793,568 A | 8/1998 | Smith | 360/103 |
| 5,910,865 A | 6/1999 | Wang et al. | 360/103 |
| 6,295,719 B1 | 10/2001 | Strom | 29/603.12 |
| 6,515,309 B1 * | 2/2003 | Tohyama et al. | 257/88 |
| 2002/0035777 A1 * | 3/2002 | Hashimoto et al. | 29/603.09 |

* cited by examiner

Primary Examiner—Thanh Nguyen
(74) Attorney, Agent, or Firm—Kinney & Lange, P.A.

(57) ABSTRACT

A method is used for forming sliders for use in a disc drive actuation system. The method comprises providing a wafer formed of a substrate having a base coat and an overcoat. Wafer-level notch lanes having a first width extend across the wafer in a first direction. The overcoat is removed from the wafer-level notch lanes. The wafer is sliced along a portion of the wafer-level lanes through the base coat to form a channel. The wafer is mechanically sliced through the substrate along slice lanes that extend across the wafer in the first direction to differentiate the wafer into bars. The bars are cut in a second direction substantially perpendicular to the first direction to form the sliders.

22 Claims, 9 Drawing Sheets

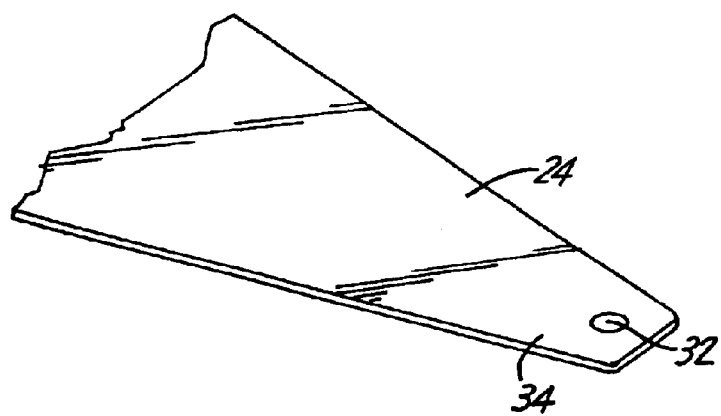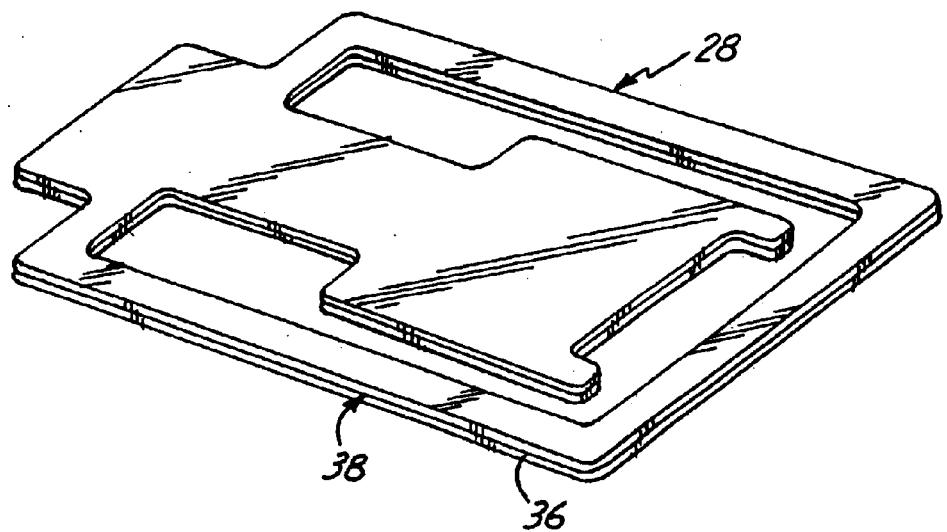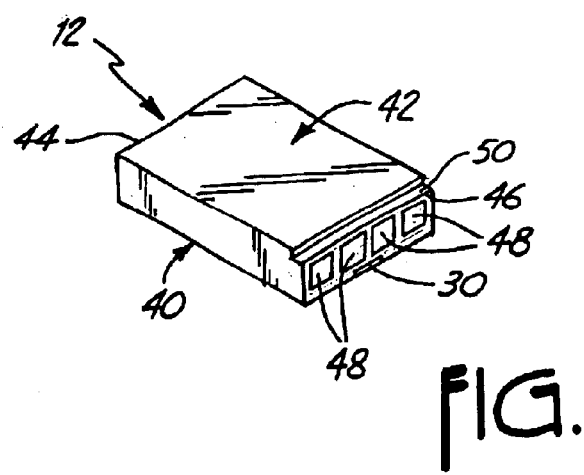
FIG. 2

LASER-ASSISTED SLICING OF NOTCHED WAFER

CROSS-REFERENCE TO RELATED APPLICATION(S)

This application claims priority from provisional application No. 60/305,742 filed Jul. 16, 2001, for "LASER-ASSISTED SLICING OF A NOTCHED WAFER" by Mohamed H. Khlif, Gordon M. Jones, Paul E. Gallup and Jumna P. Ramdular.

BACKGROUND OF THE INVENTION

The present invention relates to a method for fabricating a slider including a notch. In particular, it relates to a method of slicing a slider wafer without chipping a base coat of the wafer.

Air bearing sliders have been extensively used in disc drives to position a transducing head above a rotating disc. The transducing head is typically carried by the slider. Conventionally, head positioning is accomplished by operating an actuator arm with a large-scale actuation motor, such as a voice coil motor (VCM), to radially position the slider over a track on a disc. Typically, disc drive systems include a suspension assembly attached to the actuator arm for supporting and positioning the slider. The suspension assembly includes a load beam attached to the actuator arm and a gimbal disposed at the opposite end of the load beam. The air bearing slider carrying the transducing head is mounted to a flex circuit material disposed upon the gimbal. This type of suspension assembly is used with both magnetic and nonmagnetic discs. The VCM rotates the actuator arm and the suspension assembly to position the transducing head over a desired radial track of the disc.

In order for the disc drive to read and write data from the transducing head, conductive traces are disposed along the flex circuit material of the suspension assembly for the disc drive to electrically communicate with the slider. The traces extend along the gimbal and end at flex on suspension (FOS) bond pads formed adjacent to the slider. The slider has a trailing edge with bond pads disposed on the trailing edge such that an electrical connection can be made between the traces and the slider. Typically, gold ball bonds are used to provide the connection between the FOS bond pads and the slider bond pads. Difficulties have arisen in prior art systems for attaching the slider to the gimbal, and in particular with respect to aligning the slider bond pads to the FOS bond pads.

Generally, the slider is placed on the gimbal with respect to a load point on the load beam. The load beam has a dimple located at its distal end which serves as the load point. The gimbal is attached to the load beam such that it balances about the dimple. Although placing the slider with respect to the dimple minimizes the degradation of the slider's fly height above the disc, the slider bond pads are often either too far away or too far forward of the FOS bond pads. Misalignment of the slider bond pads with the FOS bond pads results in an increased tolerance stack up of the slider with respect to the FOS bond pads.

One solution for improving alignment between the slider bond pads and the FOS bond pads is to include wafer process assembly features on the slider. These features include a notch on the slider and a bond pad extension for the slider bond pad. The notch is typically formed on the slider body during slider processing.

In prior art systems, the slider body is formed during slider processing from a substrate, known as a wafer. The wafer is multi-layered and comprised of a substrate topped by a base coat and an overcoat. Initially, a notch is formed in the slider by removing a portion of the overcoat from slice lanes extending across the wafer in a first direction. The wafer is then sliced with a mechanical wheel along the slice lanes, or rows, into a plurality of slider bars. Furthermore, the mechanical wheel may be used to remove the overcoat to form the notch. Each slider bar includes a plurality of individual slider bodies. The slider bars are cut along a plurality of dice lanes to form individual slider bodies. The dice lanes extend across the wafer in a direction substantially perpendicular to the slice lanes.

The mechanical wheel used to slice the wafer and/or remove the overcoat causes fracturing and chipping of the base coat. The fractures and chips of the base coat extend into the slider body and underneath the overcoat causing damage to the slider body. Over time the base coat degrades and eventually disappears from the slider body. Degradation of the base coat has damaging effects on the electric and overall performance of the slider. Furthermore, the mechanical slice of the wafer creates a poorly-defined slice edge of the slider which leads to further chipping of the base coat. Chipping of the base coat and partial chipping by a poorly-defined slice edge creates hard particles and contamination in the disc drive which leads to the disc drive crashing.

A method for fabricating a slider is needed in the art that eliminates fracturing and chipping of the base coat during slicing of the wafer and creates a well defined and clear edge on the slider.

BRIEF SUMMARY OF THE INVENTION

The present invention is a method for forming sliders for use in a disc drive actuation system. The method comprises providing a wafer formed of a substrate having a base coat and an overcoat. Wafer-level notch lanes having a first width extend across the wafer in a first direction. The overcoat is removed from the wafer-level notch lanes. The wafer is sliced along a portion of the waferlevel notch lanes through the base coat to form a channel. The wafer is mechanically sliced through the substrate along slice lanes that extend across the wafer in the first direction to differentiate the wafer into bars. The bars are cut in a second direction substantially perpendicular to the first direction to form the sliders.

BRIEF DESCRIPTION OF THE DRAWINGS

FIG. 2 shows a portion of the disc drive actuation system.

DETAILED DESCRIPTION

Figure 1:
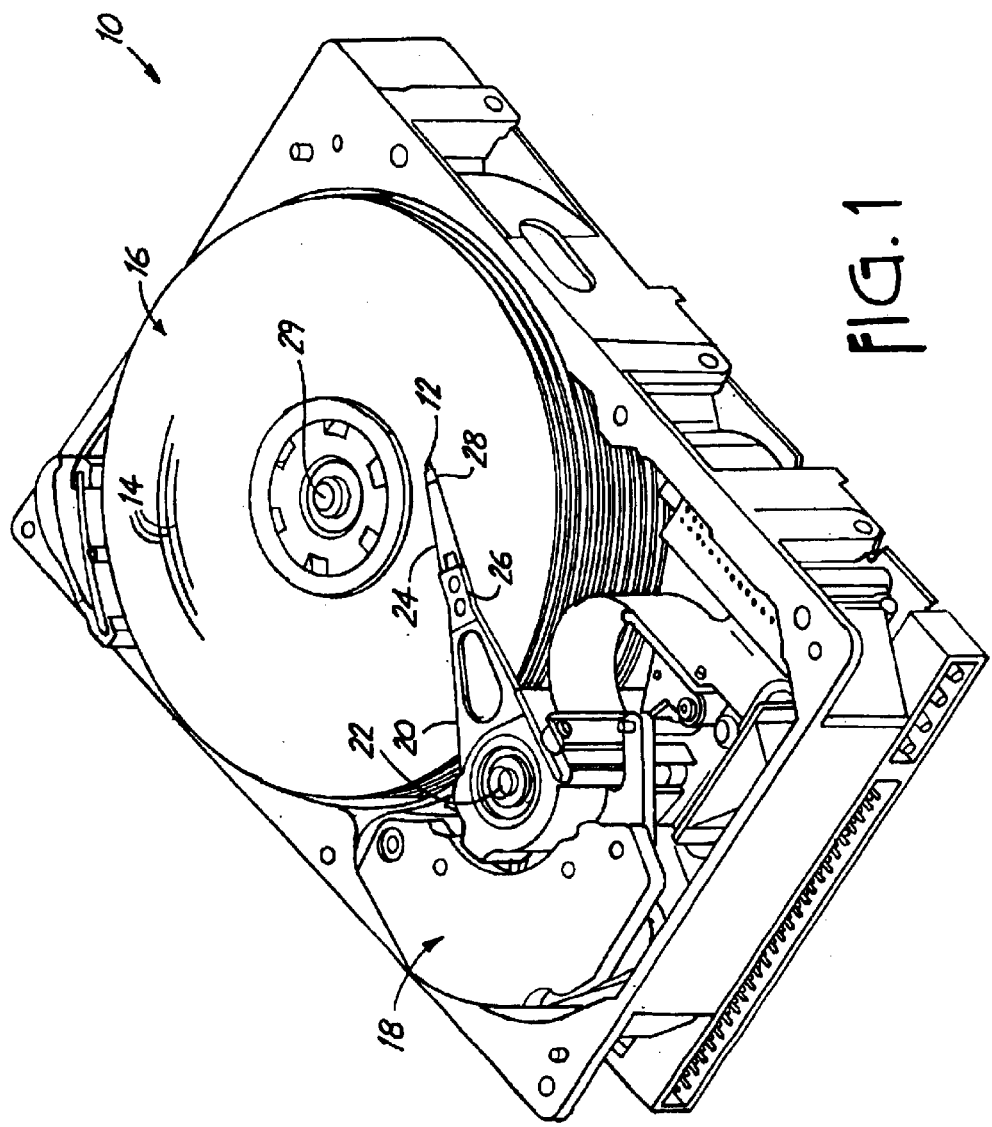
FIG. 1 shows a top perspective view of a disc drive actuation system for positioning a slider over tracks of a disc.

FIG. 1 is a perspective view of a disc drive 10 including an actuation assembly for positioning a slider 12 over a track 14 of a disc 16. Disc drive 10 includes a voice coil motor (VCM) 18 arranged to rotate an actuator arm 20 on a spindle around an axis 22. A load beam 24 is connected to actuator arm 20 at a head mounting block 26. A gimbal 28 is connected to an end of load beam 24 and slider 12 is attached to gimbal 28. Slider 12 carries a transducing head (not shown in FIG. 1) for reading and/or writing data on concentric tracks 14 of disc 16. Disc 16 rotates around an axis 29 so that windage is encountered by slider 12 to keep it aloft a small distance above the surface of disc 16.

FIG. 2 is an exploded perspective view of a portion of the actuation assembly for positioning slider 12 over track 14 of disc 16. Shown in FIG. 2, from top to bottom, are load beam 24, gimbal 28 and slider 12 carrying a transducing head 30. Load beam 24 has a dimple 32 formed on the bottom of load beam 24 at a distal end 34. Gimbal 28 is attached to load beam 24 relative to dimple 32. A flex circuit material 36 is deposited on a slider opposing face 38 of gimbal 28. Slider 12 attaches to flex circuit material 36 and is positioned on gimbal 28 such that slider 12 balances on dimple 32. Flex circuit material 36 provides a spring connection between slider 12 and load beam 24.

Slider 12 includes a disc opposing face 40 and a gimbal opposing face 42. Gimbal opposing face 42 is attached to flex circuit material 36 on the bottom surface of gimbal 28. Slider 12 has a leading edge 44 and a trailing edge 46. Trailing edge 46 extends between disc opposing face 40 and gimbal opposing face 42. Slider bond pads 48 are formed on trailing edge 46 of slider 12. In some embodiments of slider 12, slider bond pads 48 include a pad extension (not shown). A notch 50 is formed along trailing edge 46 adjacent gimbal opposing face 42. Transducing head 30 is located on trailing edge 46 of slider 12 adjacent to disc opposing face 40. In operation, load beam 24 and gimbal 28 carrying slider 12 move together as coarse positioning is performed by VCM 18 (FIG. 1) to rotate actuator arm 20 (FIG. 1).

Figure 3:
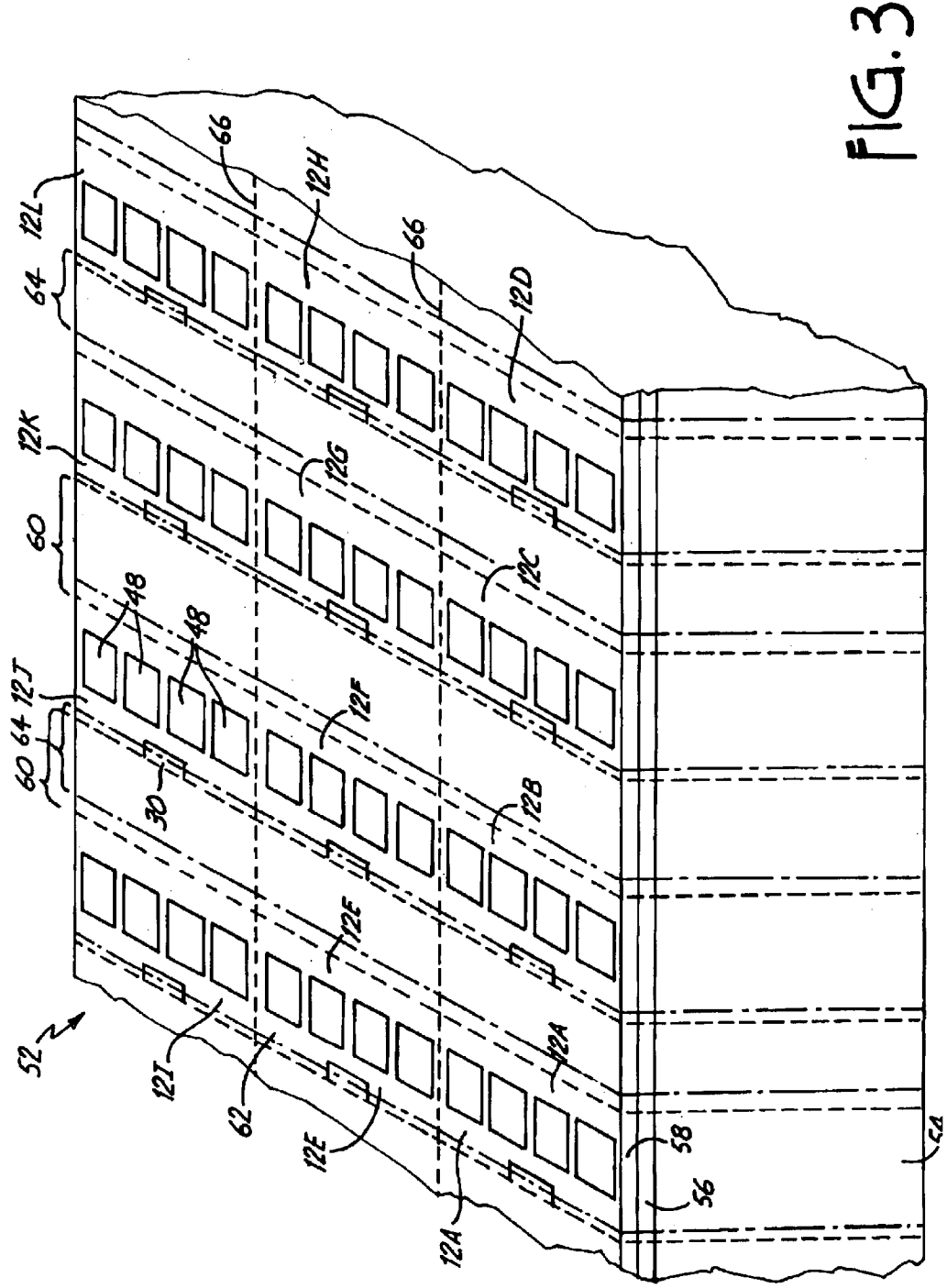
FIGS. 3 through 6 show a perspective view of a slider wafer illustrating various stages of a slider manufacturing process.

FIGS. 3 through 6 show a perspective view of a slider wafer 52 illustrating various stages of the present invention slider manufacturing process. FIG. 3 is a perspective view of a portion of wafer 52. Wafer 52 is comprised of three layers: a substrate 54, a base coat 56, and an overcoat 58. The wafer and its respective layers are not shown to scale in FIG. 3. Substrate 54 is preferably comprised of AlTiC (aluminum titanium carbide), while base coat 56 and overcoat 58 are preferably comprised of alumina. Base coat 56 preferably has a thickness of about 3 microns and overcoat 58 preferably has a thickness of about 45 microns.

Wafer 52 has a plurality of wafer-level notch lanes 60 extending across a top surface 62 of wafer 52 in a first direction. Wafer 52 also has a plurality of slice lanes 64 extending across top surface 62 in the first direction. Slice lanes 64 are substantially parallel to and offset from wafer-level notch lanes 60. Dice lanes 66 extend across top surface 62 of wafer 52 in a second direction and substantially perpendicular to wafer-level notch lanes 60. Slice lanes 64 and dice lanes 66 define sliders 12 (identified as 12A–12L) which are to be manufactured by the present invention process. Top surface 62 of wafer 52 corresponds to trailing edge 46 (not shown) of slider 12. Transducing head 30 and slider bond pads 48 are formed on top surface 62 of wafer 52 prior to forming sliders 12.

Figure 4:
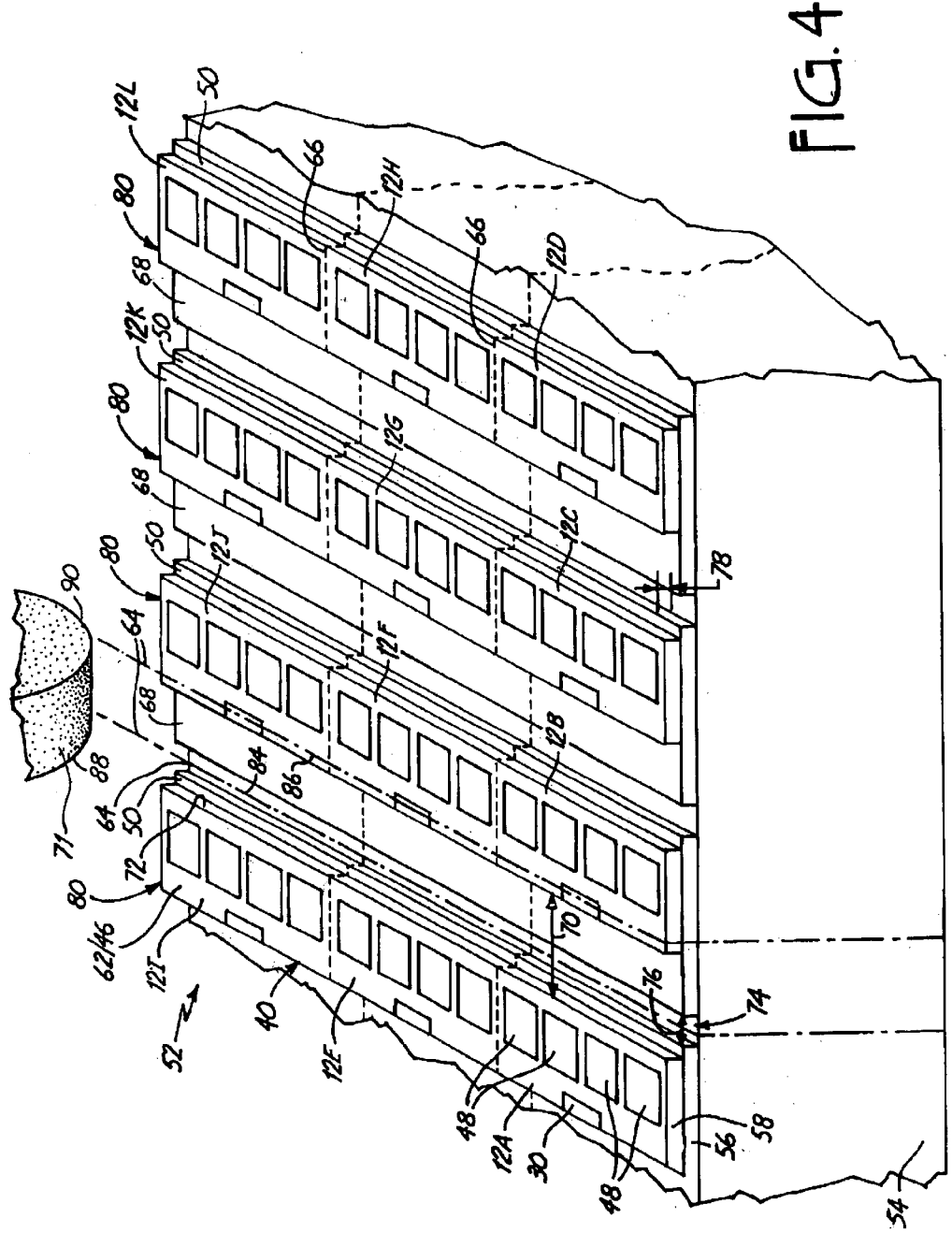

FIG. 4 is a perspective view of wafer 52 with overcoat 58 and a portion of base coat 56 removed from wafer-level notch lanes 60 to form waferlevel notches 68. Overcoat 58 is removed from about the entire width of waferlevel notch lanes 60 from edge to edge. Overcoat 58 is removed using a chemical or a physical process. For example, overcoat 58 can be removed using an etching process. Each wafer-level notch 68 has a width 70. Width 70 is preferably between about 50 microns and a width of a mechanical grinding wheel 71 (discussed below), or slicing wheel, used to slice wafer 52 plus an associated error of about 25 microns (e.g., between about 50 microns and about 125 microns). Removal of overcoat 58 from wafer-level notch lanes 60 forms a reference edge 72.

A channel 74 is sliced through base coat 56 within wafer-level notch 68. Channel 74 is preferably sliced flush with reference edge 72, however, due to positioning errors channel 74 is offset from reference edge 72 by no more than 5 microns. Channel 74 has a width 76. Width 76 of channel 74 is preferably smaller than width 70 of wafer-level notch 68 and greater than 45 microns. Channel 74 has a depth 78, which is approximately equal to the thickness of base coat 56 of wafer 52. Removal of overcoat 58 and the slicing of channel 74 forms notch 50 along trailing edge 46 and gimbal opposing face 42 of slider 12 (best seen in FIGS. 2 and 7). Notch 50 is discussed in further detail in U.S. patent application Ser. No. 10/010,169, filed on Nov. 13, 2001, entitled "HGA BALLBOND ASSEMBLY WITH WAFER PROCESS ASSEMBLY FEATURES" by Richard L. Segar et al., and assigned to Seagate Technology LLC, which is incorporated herein by reference.

Slicing wafer 52 to form channel 74 within wafer-level notch 68 substantially eliminates chipping of base coat 56 upon differentiation of wafer 52 into slider bars 80. Pre-slicing channel 74 through base coat 56 also improves slice edge definition of slider 12 along gimbal opposing face 42 (as seen in FIG. 2). After overcoat 58 is removed from wafer-level notch lanes 60, the thin layer of base coat 56 remains. Slicing base coat 56 with mechanical grinding wheel 71, fractures the base coat and chips get in between the layers of wafer 52. Upon impact of grinding wheel 71 with the thin layer of base coat 56, the base coat would fracture and chip.

Channel 74 is preferably formed in base coat 56 by slicing with a laser. The laser beam parameters can be adjusted for slices of differing depths, widths and shapes. It is important to remove base coat 56 from wafer-level notch 68 with minimal heat involvement so that no degradation of the wafer material occurs. Most preferably, a fourth harmonic generated laser beam may be utilized and has a wavelength of about 266 nanometers. Alternatively, a third harmonic generated laser beam is used which has a wavelength of about 355 nanometers. The laser preferably has a pulse frequency of 10,000 Hertz (Hz) or greater, and the duration of the laser pulse is preferably 30 nanoseconds or less. Preferably, a fast beam with a wavelength in the UV region and a pulse duration of about 15–30 nanoseconds is used or an ultrafast beam with a wavelength between the UV region and the near IR region and a pulse duration of about 100–150 femtosecond is used. Examples of the type of lasers used include a solid state diode YAG pumped laser or an Excimer laser. In other embodiments of the present invention process, those skilled in the art will realize other devices may be used to create channel 74, including a narrow energy beam.

Figure 5:
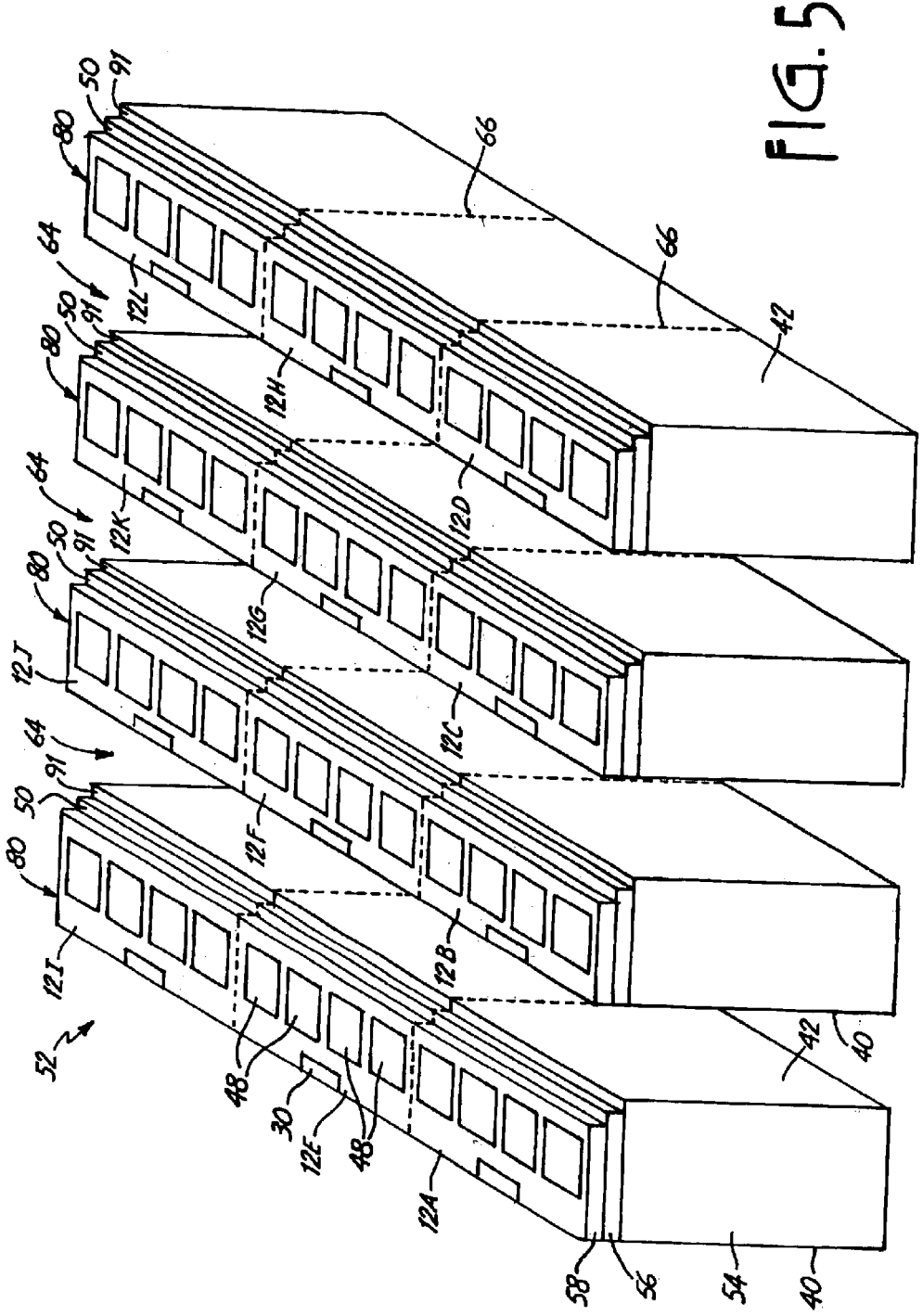

Slice lanes 64 extend across wafer 52 substantially parallel to waferlevel notches 68 and offset from wafer-level notches 68. Mechanical grinding wheel 71 passes through slice lanes 64 to slice wafer 52 into slider bars 80 (as seen in FIG. 5). Grinding wheel 71 and slice lane 64 are preferably offset from reference edge 72 by about 35 microns. A width of slice lane 64 is approximately equal to a width of mechanical grinding wheel 71. Each slice lane 64 has a first side 84 and a second side 86 corresponding to a first edge 88 and a second edge 90 of grinding wheel 71. To prevent chipping of base coat 56, it is important that first side 84 of slice lane 64 passes through channel 74. Second side 86 of slice lane 64 passes through overcoat 58, base coat 56 and substrate 54 adjacent transducer 30, and outside of wafer-level notch 68.

FIG. 5 is a perspective view of wafer 52 sliced into slider bars 80. Wafer 52 is differentiated into slider bars 80 by slicing wafer 52 completely through substrate 54, base coat 56 and overcoat 58. Mechanical grinding wheel 71 (shown in FIG. 4) is preferably used to slice wafer 52 into slider bars 80. Channel 74 provides a clearance for first edge 88 of grinding wheel 71 to pass through, thereby forming gimbal opposing face 42 of slider 12. When grinding wheel 71 passes through channel 74 to differentiate the wafer 52, grinding wheel 71 does not contact or cause damage to base coat 56, such as chipping or fracturing, along gimbal opposing face 42. Second edge 90 of grinding wheel 71 passes through overcoat 58, base coat 56 and substrate 54 adjacent transducer 30 to form disc opposing face 40. Since grinding wheel 71 passes through the thicker overcoat 58 before passing through base coat 56, damage to base coat 56 does not occur. On disc opposing face 40 all three layers of wafer 52 are flush to each other.

Differentiating wafer 52 into slider bars 80 forms notch 50, between overcoat 58 and base coat 56, and a second notch 91, between base coat 56 and substrate 54, adjacent gimbal opposing face 42. Notch 50 preferably has a heigh of about 45 microns and a width between 25 to 45 microns. Second notch 91 is negligible and preferably has a height equal to base coat 56 of 3 microns and a width between zero to 5 microns.

Figure 6:
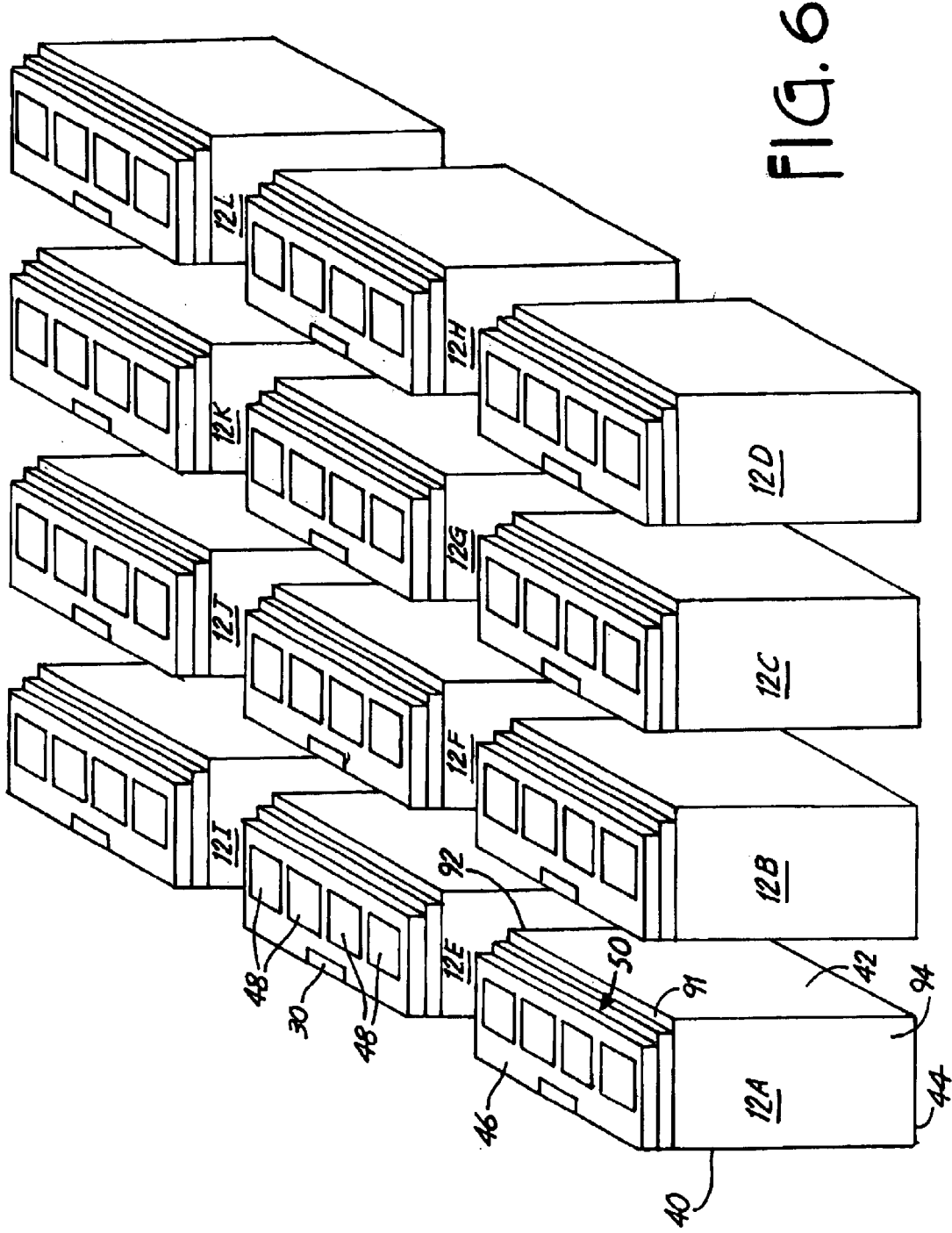
Figure 7:
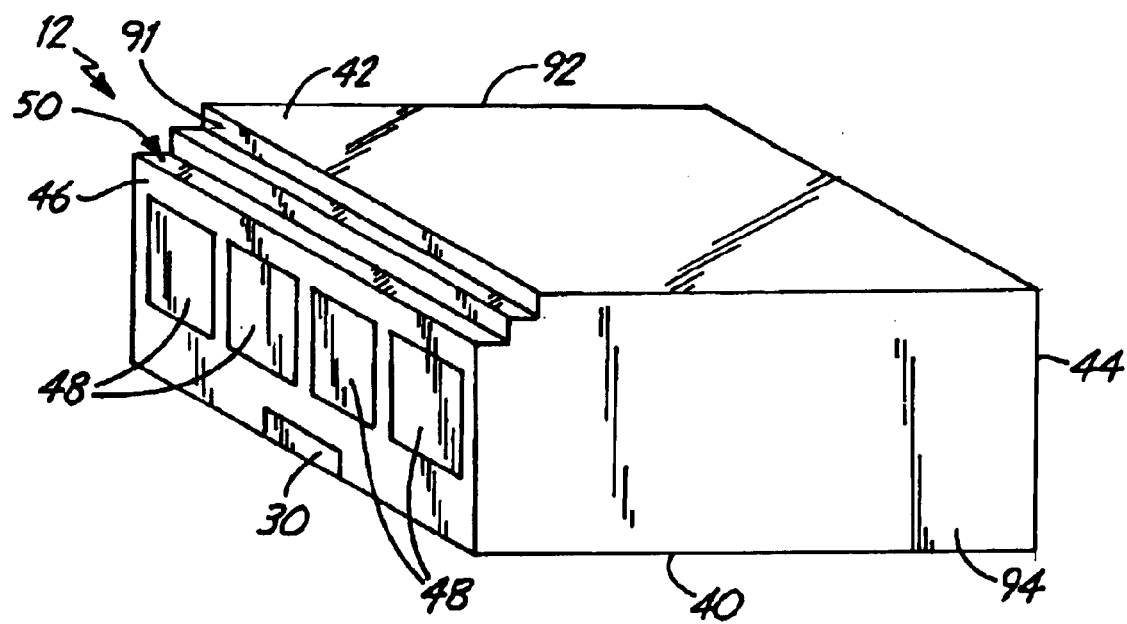
FIG. 7 shows a perspective view of a slider formed by the manufacturing process of the present invention.

FIGS. 6 and 7 are perspective views of slider 12 formed by the manufacturing process of the present invention. FIG. 6 shows a perspective view of sliders 12 after slider bars 80 have been cut and FIG. 7 shows a perspective view of an individual slider 12. Slider bars 80 are cut along dice lanes 66 to differentiate slider bars 80 into sliders 12. Slider bars 80 may be cut along dice lanes 66 using many methods, including a slice wheel, a laser system or a highly pressurized jet fluid. Cutting slider bars 80 completely through wafer 52 along dice lanes 66 creates first and second side edges 92 and 94 of slider 12. Notch 50 is located along trailing edge 46 adjacent gimbal opposing face 42 of slider 12. There are other steps that may be performed during slider fabrication, including cleaning, bar lapping, milling of the air bearing surface, coating and flatness adjustment.

Figure 8:
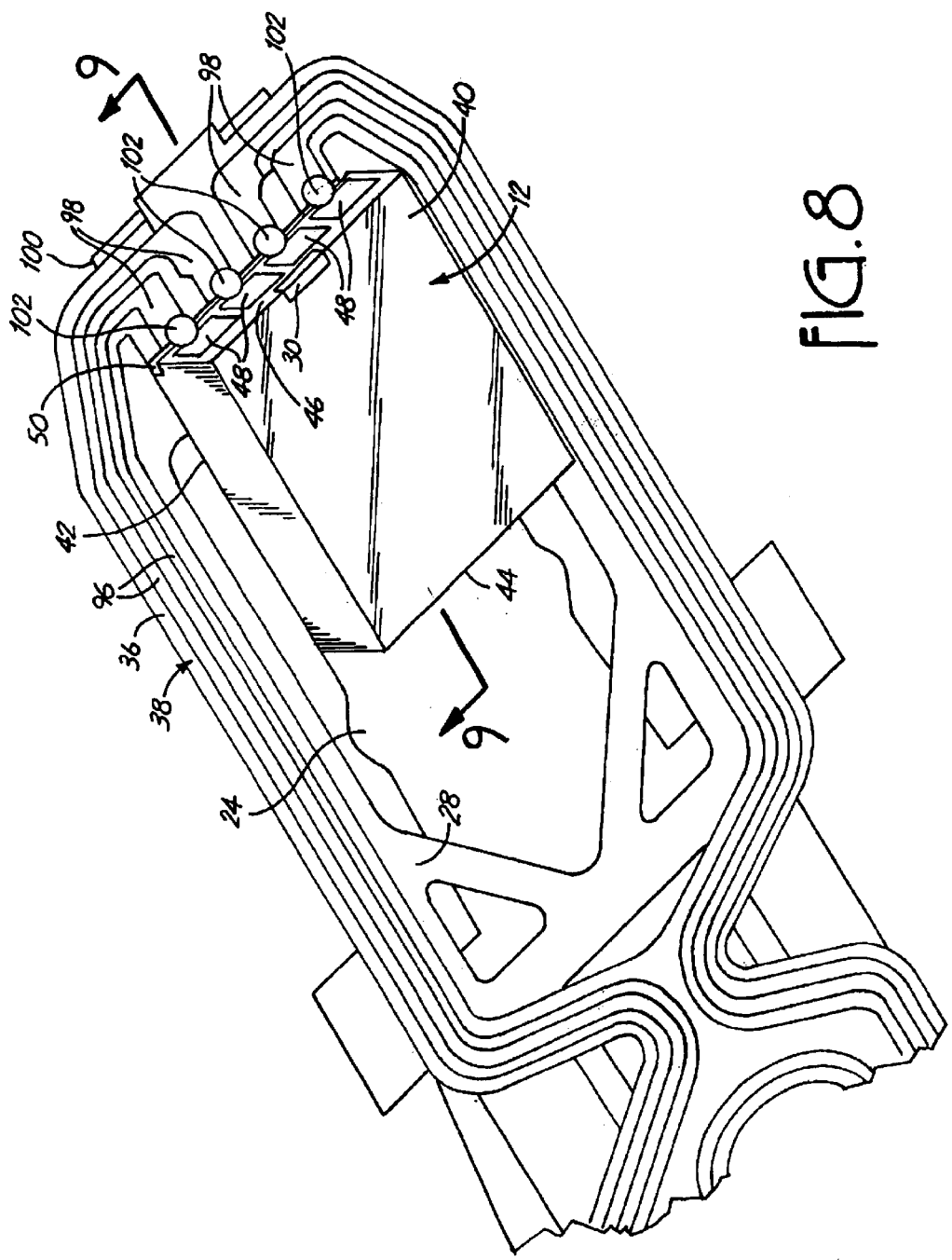
FIG. 8 shows a bottom perspective view of the distal end portion of the disc drive actuation system of FIG. 1.

FIG. 8 is a perspective view of a disc opposing surface of the distal end portion of the actuation assembly. Gimbal 28 is attached to load beam 24 relative to dimple 32 (not shown). Flex circuit material 36 is disposed on slider opposing face 38 of gimbal 28. Flex circuit material 36 generally travels along the underside of gimbal 28, load beam 24, and the length of actuator arm 20 all the way to circuitry located in another part of the disc drive (not shown).

A trace layer 96 is disposed upon flex circuit material 36. Trace layer 96 completes a circuit connection between the electronic components of the disc drive (not shown) and transducing head 30 carried by slider 12. Trace layer 96 travels along the underside of gimbal 28, load beam 24 and the length of the actuator arm 20 on top of flex circuit material 36. Each trace 96 ends at a flex on suspension (FOS) bond pad 98, which is an etched component of flex circuit material 36. In an exemplary embodiment there is at least one FOS bond pad 98 located on flex circuit material 36 for each slider bond pad 48 located on slider 12. FOS bond pads 98 are preferably located proximate to a front edge 100 of gimbal 28 and forward of where slider 12 is attached to gimbal 28.

Gimbal opposing face 42 (FIG. 2) of slider 12 is attached to flex circuit material 36 disposed on slider opposing face 38 (as viewed in FIG. 8 on the bottom of gimbal 28) of gimbal 28. Transducing head 30 is located on trailing edge 46 of slider 12 adjacent disc opposing face 40. When slider 12 is attached to gimbal 28, trailing edge 46 of slider 12 is located proximate to front edge 100 of gimbal 28 such that slider bond pads 48 located on trailing edge 46 of slider 12 are positioned adjacent to and aligned with FOS bond pads 98. An adhesive (not shown) is used to bond slider 12 to gimbal 28 with flex circuit material 36 between slider 12 and gimbal 28.

When slider 12 is attached to gimbal 28, slider bond pads 48 are aligned with FOS bond pads 98 of gimbal 28. A gold ball bond 102 is disposed on each slider bond pad 48, and then bonded to slider bond pad 48 and its respective FOS bond pad 98. Ball bonds 102 act as an electrical conduit and complete the electrical connection between slider 12 and trace layer 96.

Figure 9:
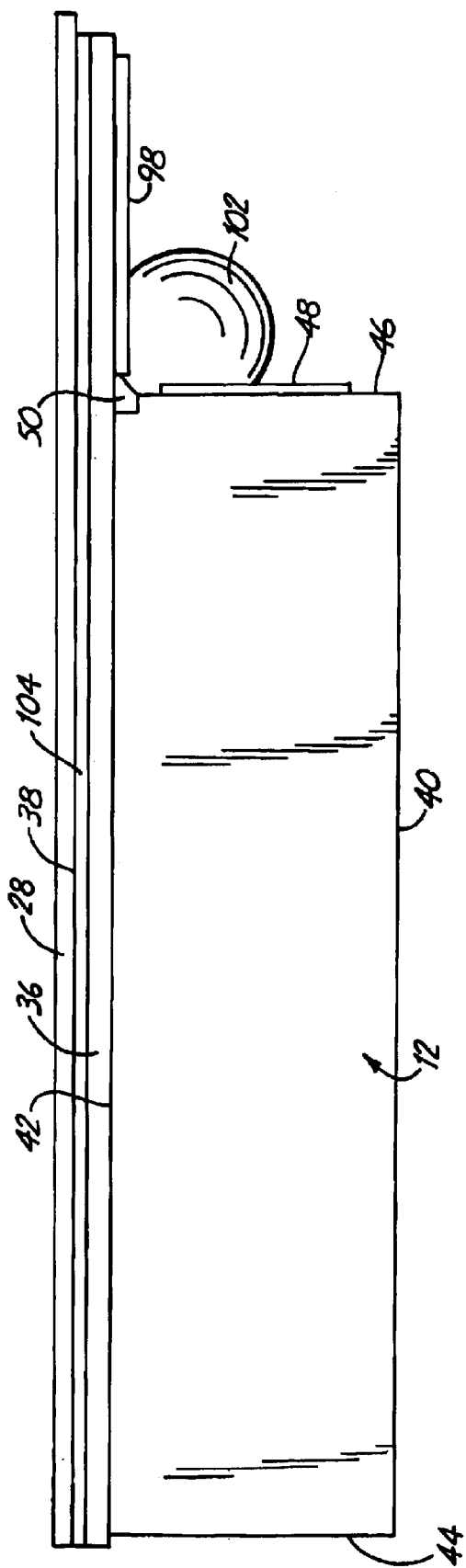
FIG. 9 is a cross-sectional view of the slider formed by the present invention manufacturing process attached to a gimbal.

The wafer process assembly features of slider 12, notch 50 and slider bond pads 48, allow slider 12 to be placed on gimbal 28 with respect to dimple 32 such that proper placement is achieved in repetitive processes. FIG. 9 is a cross-sectional view of one embodiment of slider 12 attached to flex circuit material 36. Slider 12 is attached to gimbal 28 such that slider bond pad 48 is aligned with FOS bond pad 98. Flex circuit material 36 is disposed between slider 12 and gimbal 28. An adhesive 104 is used to attach flex circuit material 36 to gimbal 28. Notch 50 formed along trailing edge 46 of slider 12 is located adjacent to gimbal opposing face 42. Gold ball bond 102 is connected to both slider bond pad 48 and FOS bond pad 98.

Slider bond pad 48 and notch 50 improve the likelihood of properly aligning slider bond pads 48 to FOS bond pads 98. Slider bond pad 48 and notch 50 provide a margin when positioning slider 12 on gimbal 28 by allowing more room to compensate for potential mis-alignment. By adding notch 50 to trailing edge 46 of slider 12 and extending slider bond pad 48 (for example, with a pad extension), once slider 12 is placed on flex circuit material 36, the desired placement and alignment between bond pads 48 and 98 results. Notch 50 of slider 12 provides a tolerance buffer which allows slider 12 to be positioned on gimbal 28, relative to dimple 32, to ensure proper bonding can occur and improves the likelihood of properly aligning slider bond pads 48 with FOS bond pads 98 by compensating for potential misalignment.

A notch, included as a wafer process assembly feature of a slider, improves alignment between slider bond pads of the slider and FOS bond pads located on a gimbal. In prior art systems, the notch was formed at the wafer level by slicing the wafer with a mechanical wheel. Slicing the base coat of the wafer with a mechanical wheel causes chipping and fracturing to the base coat. The fractures and chips of the base coat extend into the slider body and underneath the overcoat, thereby causing damage to the slider body. Over time, the base coat degrades from the sliderbody. In addition, the mechanical slice of the wafer creates an ill-defined slice edge of the slider. Degradation of the base coat results in poor electric and overall performance of the slider and disc drive. Chipping of the base coat and partial chipping by a poorly-defined slice edge creates hard particles and contamination in the disc drive. Over time, these particles lead to the disc drive crashing.

The present invention is a method for manufacturing sliders, including a notch, that substantially eliminates chipping and fracturing of the base coat and improves slice edge definition of the slider. The present invention is a dual step slicing process for slicing a wafer. After the overcoat is removed from the wafer-level notch lanes extending across the wafer, a channel is sliced through the base coat in the wafer-level notch with a laser. Removal of the overcoat and forming the channel creates the notch. Next, a mechanical grinding wheel is passed through slice lanes extending across the wafer to further slice through the substrate and differentiate the wafer into slider bars. The slice lanes are offset from the wafer-level notch and include a portion of the channels. Thus, when the wheel passes through the channel it does not contact the base coat and thereby cause chipping and fracturing. Furthermore, the laser slice through the base coat improves the slice edge definition of the slider along the gimbal opposing face of the slider without fracturing the base coat.

Although the present invention has been described with reference to preferred embodiments, workers skilled in the art will recognize that changes may be made in form and detail without departing from the spirit and scope of the invention. For example, the wafer processing method may be used in other fields of endeavor for processing a wafer into individualized devices, such as semiconductors.

What is claimed is:

1. A method for processing a wafer into individualized devices, the method comprising:
   providing a wafer, the wafer formed of a substrate having a base coat and an overcoat;
   removing the overcoat from wafer-level notch lanes having a first width and extending across the wafer in a first direction;
   slicing the wafer through the base coat along the wafer-level notch lanes to form a channel, wherein the channel has a second width smaller than the first width, and further wherein a notch is formed on the devices;
   mechanically slicing the wafer through the substrate along slice lanes extending across the wafer in the first direction to form bars, the slice lanes having a third width greater than the second width; and
   cutting the bars in a second direction substantially perpendicular to the first direction to form the devices.

2. The method of claim 1 wherein slicing the wafer through a base coat uses a laser.

3. The method of claim 1 wherein the slice lanes are offset from the wafer-level notch lanes.

4. The method of claim 3 wherein each slice lane overlaps a portion of the respective channel.

5. The method of claim 1 wherein the individualized device is a slider.

6. A method for forming sliders, the method comprising:
   providing a wafer, the wafer formed of a substrate having a base coat and an overcoat, wherein wafer-level notch lanes having a first width extend across the wafer in a first direction;
   removing the overcoat from the wafer-level notch lanes;
   slicing the wafer along a portion of the wafer-level notch lanes through the base coat to form a channel wherein a notch is formed on the wafer;
   mechanically slicing the wafer through the substrate along slice lanes that extend across the wafer in the first direction to differentiate the wafer into bars; and
   cutting the bars in a second direction substantially perpendicular to the first direction to form the sliders.

7. The method of claim 6 wherein the channel has a second width.

8. The method of claim 7 wherein the first width is larger than the second width.

9. The method of claim 7 wherein the second width is greater than 45 microns.

10. The method of claim 6 wherein the slice lanes are offset from the wafer-level notch lanes and a portion of the slice lanes passes through the channel.

11. The method of claim 6 wherein the removing step forms a reference edge along the overcoat and the channel is offset from the reference edge by no more than 5 microns.

12. The method of claim 6 wherein the base coat has a thickness of about 3 microns.

13. The method of claim 6 wherein the slicing step is performed by a laser.

14. The method of claim 13 wherein the laser has a wavelength ranging between UV and near-IR.

15. The method of claim 13 wherein the laser has a pulse of about 20 nanoseconds.

16. The method of claim 6 wherein the substrate is comprised of aluminum titanium carbide.

17. The method of claim 6 wherein the base coat is comprised of alumina.

18. The method of claim 6 wherein the mechanically slicing step uses a grinding wheel.

19. In a method for fabricating sliders wherein a slider wafer is formed from a substrate having a base coat and an overcoat, the method comprising slicing the wafer in a first direction to form slider bars and cutting the slider bars in a second direction substantially perpendicular to the first direction to form the sliders, an improvement comprising:
   removing the overcoat from wafer-level notch lanes extending across the wafer in the first direction, the wafer-level notch lanes having a first width;
   slicing the wafer through the base coat along the wafer-level notch lanes to form a channel, the channel having a second width smaller than the first width wherein a notch is formed on the wafer; and
   mechanically slicing the wafer through the substrate along slice lanes extending across the wafer in the first direction.

20. The method of claim 19 wherein the slice lanes are offset from the wafer-level notch lanes and a portion of the slice lanes pass through the channel.

21. The method of claim 19 wherein the slicing step is performed by a laser.

22. The method of claim 19 wherein the slicing step is performed by a narrow energy beam.

* * * * *

UNITED STATES PATENT AND TRADEMARK OFFICE
CERTIFICATE OF CORRECTION

PATENT NO. : 6,756,287 B2
DATED : June 29, 2004
INVENTOR(S) : Mohamed Salah H. Khlif et al.

It is certified that error appears in the above-identified patent and that said Letters Patent is hereby corrected as shown below:

Title page,
Item [*] Notice, delete "bydays.days." insert -- by 302 days --.

Signed and Sealed this

Twenty-seventh Day of December, 2005

JON W. DUDAS
*Director of the United States Patent and Trademark Office*